United States Patent [19]

Parker et al.

[11] Patent Number: 4,588,383
[45] Date of Patent: May 13, 1986

[54] INTERACTIVE SYNTHETIC SPEECH CPR TRAINER/PROMPTER AND METHOD OF USE

[75] Inventors: William S. Parker, New Haven; Harold M. Stillman, Stamford, both of Conn.

[73] Assignee: The New Directions Group, Inc.

[21] Appl. No.: 605,593

[22] Filed: Apr. 30, 1984

[51] Int. Cl.$^4$ .................... G09B 5/06; A61H 31/00
[52] U.S. Cl. .................... 434/265; 364/415; 128/28
[58] Field of Search .............. 434/169, 265, 292; 128/687; 364/415

[56] References Cited

U.S. PATENT DOCUMENTS

| | | | |
|---|---|---|---|
| 3,520,071 | 7/1970 | Abrahamson et al. | |
| 4,234,761 | 11/1980 | Wiggins, Jr. et al. | 434/169 |
| 4,290,114 | 9/1981 | Sinay | 364/415 |
| 4,302,193 | 11/1981 | Haynes | |
| 4,307,728 | 12/1981 | Walton | 128/687 |
| 4,331,426 | 5/1982 | Sweeney | 434/265 |
| 4,360,345 | 11/1982 | Hon | 434/265 |
| 4,401,848 | 8/1983 | Tsunoda | |
| 4,408,096 | 10/1983 | Washizuka et al. | |

Primary Examiner—Richard C. Pinkham
Assistant Examiner—Vincent A. Mosconi
Attorney, Agent, or Firm—Pasquale A. Razzano

[57] ABSTRACT

An interactive trainer/prompter device serves to provide visual and synthetic-speech prompts to a human operative to achieve a task that requires skills that may be critical, but infrequently required. In favorable embodiment, the trainer/prompter device is employed for cardio pulmonary resuscitation. The device has a plurality of actuator push buttons and indicator lamps, and provides synthetic voice prompts. The human operative follows synthetic-speech instructions, and interacts with the device by depressing the appropriate push button, for example, to indicate that a victim is not breathing, or has no detectable pulse.

12 Claims, 9 Drawing Figures

FIG. 1
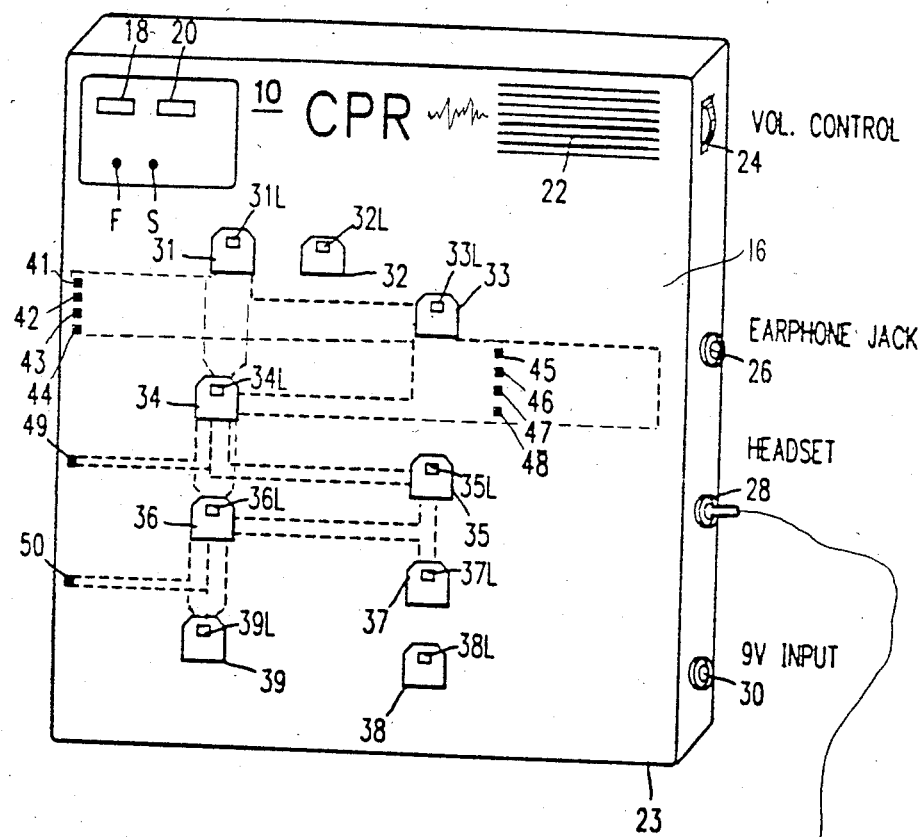
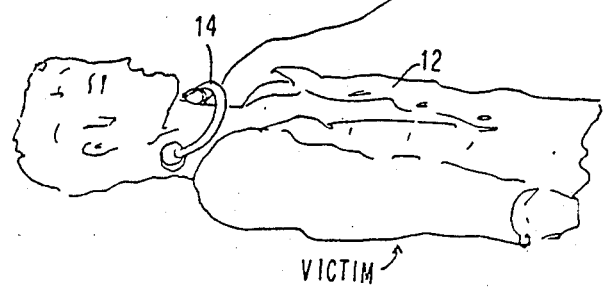

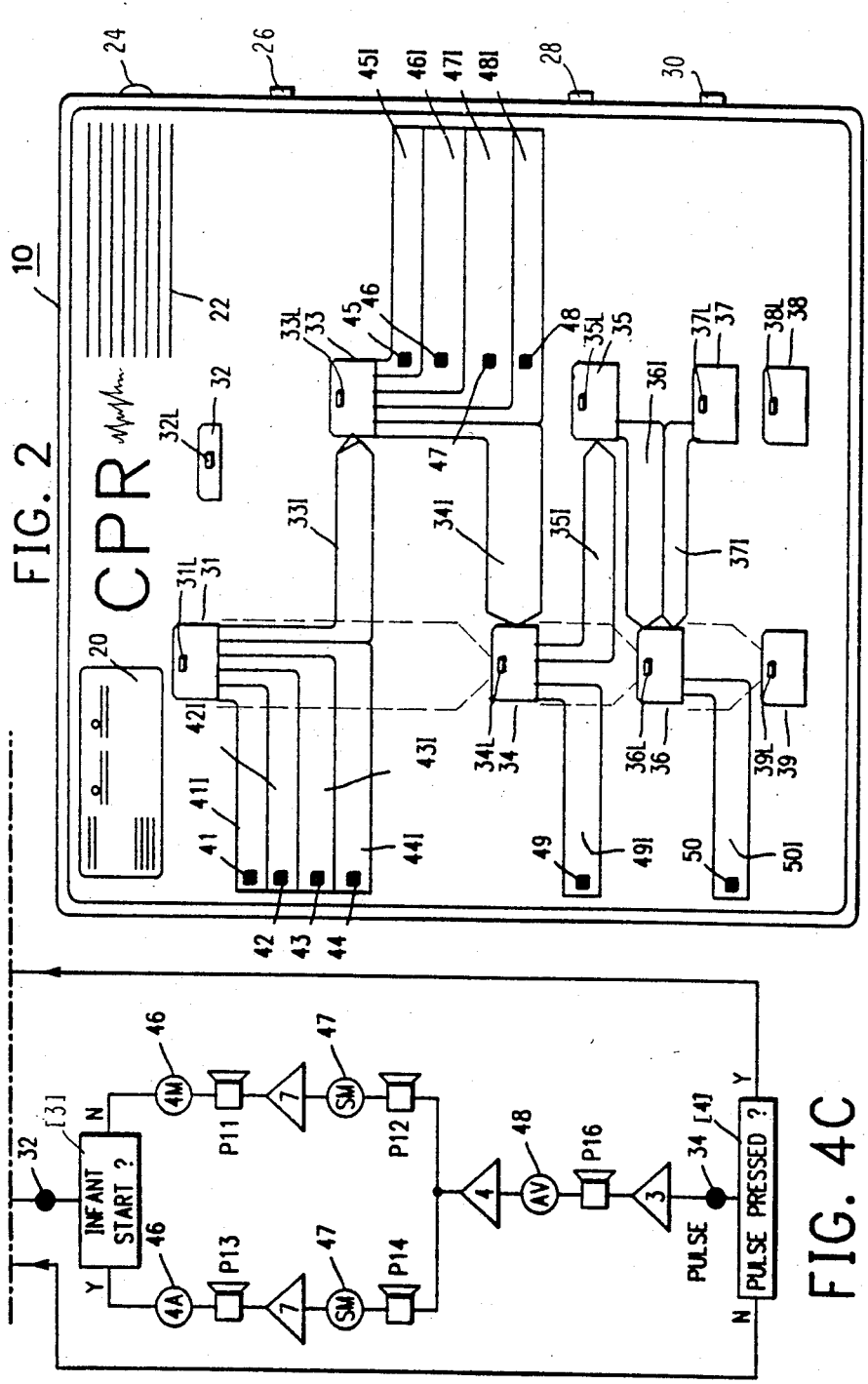

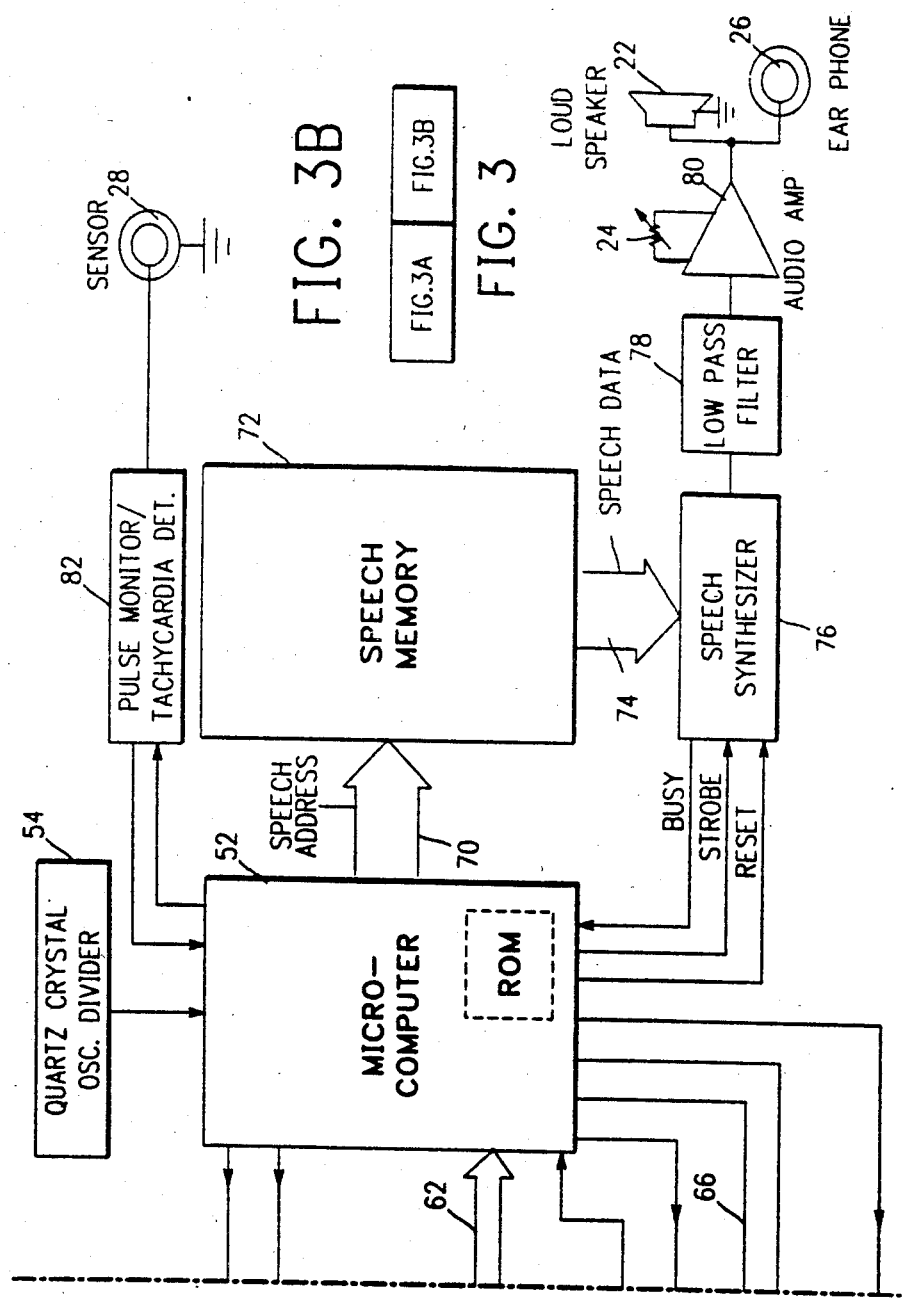

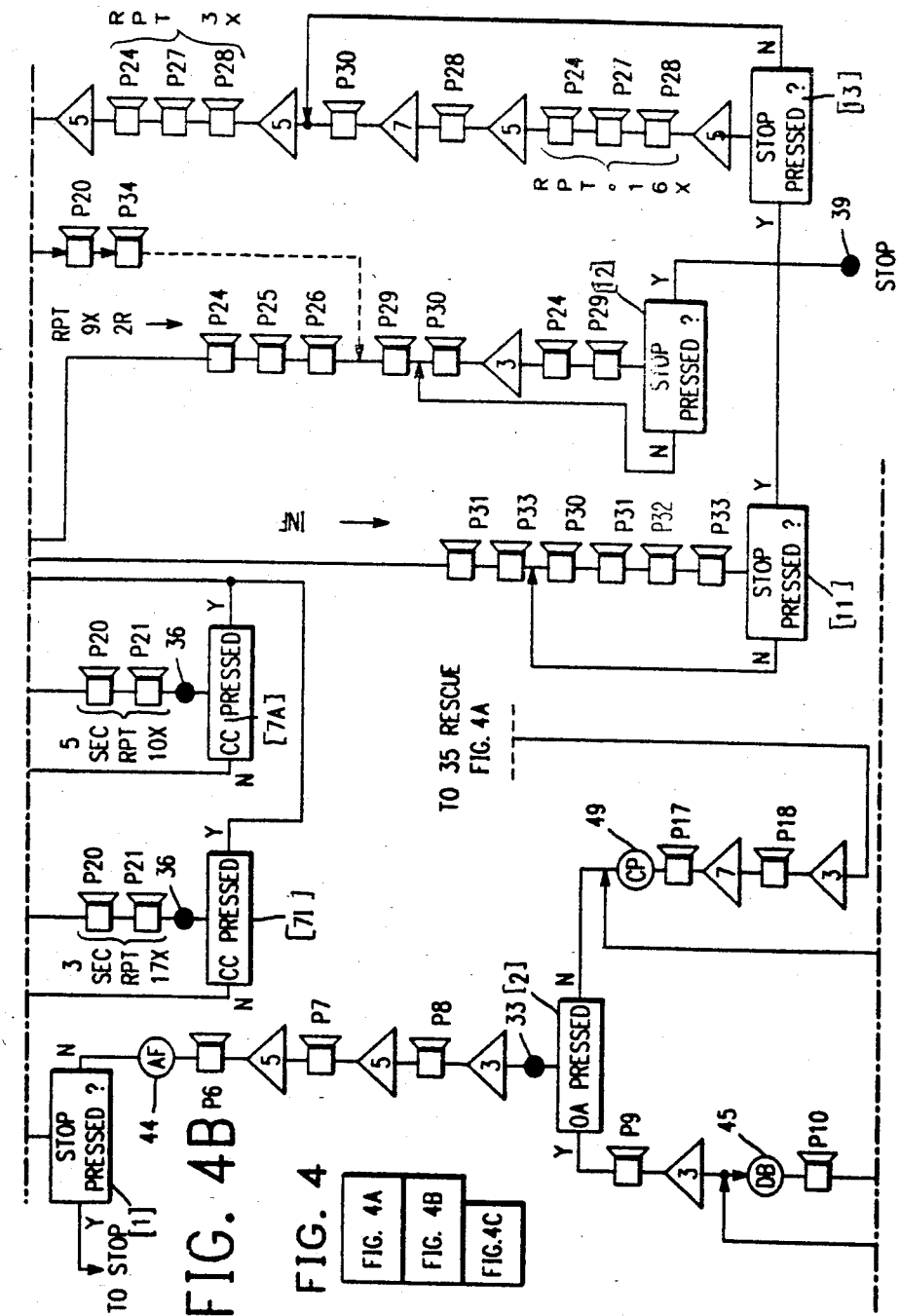

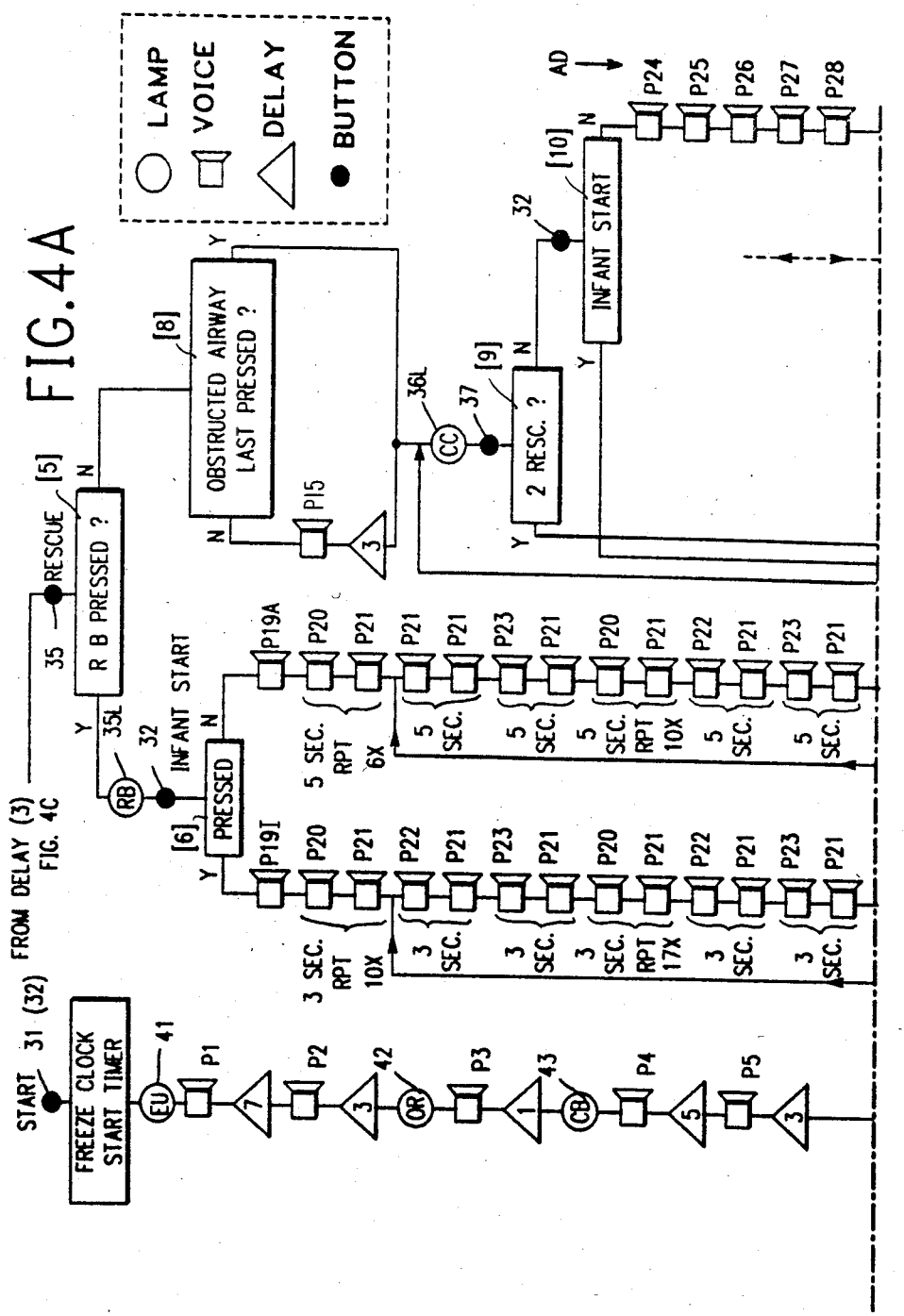

INTERACTIVE SYNTHETIC SPEECH CPR TRAINER/PROMPTER AND METHOD OF USE

This invention relates to devices for use in rendering medical assistance, especially cardio pulmonary resuscitation (CPR). The invention is more particularly directed to a device employing synthetic speech for the initial and refresher CPR training and which can also be used for providing voice "prompts" to aid CPR-certified persons during medical emergencies.

It is estimated that several hundred thousand persons perish each year who could have been saved if someone around them had had the knowledge or means to render assitance in the form of cardio pulmonary resuscitation, or CPR. Medical emergencies for which CPR would be of great value include strokes, drownings, auto accidents, drug intoxication, suffocation, electrocution, and heart attacks. In the case of a stroke, the victim may need assistance only to open breathing passages, but without rapid diagnosis and treatment of an airway obstruction, the victim may die before professional help can arrive. Each of the other-mentioned medical emergencies can lead to obstructed breathing, cessation of breathing, or heart arrest, and the victims can be saved if those around them can recognize the problem and act immediately and effectively.

While there has been a widespread effort, particularly on the part of the American Heart Association and the American Red Cross, to train persons in the basically simple procedures of CPR, a lack of suitable affordable training aids has limited the availability of CPR training to the general public. Also, while CPR skills can be readily learned, if they are not practiced the skills quickly become rusty or forgotten.

Where heart beat and breathing have stopped, a victim has only approximately four minutes in which a bystander can act to save or restore his life. In an emergency, some action on the part of a bystander is better than no action at all, and even an unpracticed skill can be used to save a life. However, even though CPR involves basically simple procedures, if applied improperly, the victim can be severly injured.

Although many thousands of people receive CPR training, there is a lack of affordable training aids and consequently infrequent opportunity to practice skills. Thus, CPR skills quickly deteriorate. Accordingly, when an emergency does arise, a CPR trained person, whether professional or lay, may not function as well as he or she would have functioned if the skills were fresh. Recently, many persons have attempted to design electronic training devices which can apply modern technology to the training of both lay and professional persons in cardio pulmonary resuscitation (CPR). These efforts have involved televised instruction and computer-aided instruction.

Moreover, previously-proposed coaching or training systems have involved rather elaborate and expensive arrangements, and were not conducive to wide-scale training, nor could they be made sufficiently portable to be available in an unforeseen emergency outside the class room.

No previously-proposed system has been made available which is suitable both for development of initial CPR skills and concepts, and also to prompt a CPR-trained person, whose skills may have become somewhat rusty, when that person encounters a victim in need of cardio-pulmonary resuscitation.

Also, many persons who have been CPR trained, but who have not applied their skills or become recertified, tend to hesitate, rather than act, when encountering a victim of a medical emergency. Such persons would be more likely to offer aid and to render effective assistance if there were some portable, inexpensive mechanism which could prompt and guide them through the steps for cardio-pulmonary resuscitation.

Accordingly, it is an object of this invention to provide a device which enhances training in a skill which is critical, but which would be needed only infrequently, e.g., in a medical emergency.

It is a further object of this invention to provide a device which can provide emergency prompting in a critical skill by effective use of synthetic speech.

It is yet another object of this invention to provide a synthetic speech training/prompting device and method in which a controlled sequence of steps follow the protocols and procedures of a particular skill, such as the CPR training programs of the American Heart Association and the American Red Cross.

It is still another object of this invention to provide such a device which can provide clear step-by-step prompting in English, or in another appropriate tongue, in the protocols and procedures of CPR.

It is a further object of this invention to provide a CPR training/prompting device in which a rescuer is guided through the CPR protocol on a visual display having a programmed sequence of lights or other visual display means and mode change buttons which provide the rescuer with a multi-media teaching/prompting system.

In accordance with an embodiment of this invention, a CPR training/prompting device is provided in a housing dimensioned to make it lightweight and portable. On one face of the housing is a panel on which there are disposed a plurality of manually actuable selectors, or mode-change push buttons. Within the housing is a digital processing system including input buffers coupled to the manually actuable selectors, a microprocessor having a storage section for storing a program directed to the CPR protocol, in which a human operative or rescuer interacts with the device so that he or she may be trained and/or prompted, with the sequences of the program being governed in response to actuation of the various selectors. The microprocessor has a speech address output providing speech commands in accordance with the program. The device also includes a synthetic speech generator providing audible voice prompts to the rescuer. This generator includes a speech memory having an input coupled to receive the speech commands from the speech address output of the microprocessor, and an output providing speech data which are provided to a speech synthesizer circuit. In the latter, the speech data are converted to an analog voice frequency signal, and are fed to an audio output circuit which converts the voice-frequency signal into acoustic form as voice prompts.

In this embodiment, the skill involved is cardio-pulmonary resuscitation. However, the techniques of this invention could be employed to advantage in the training or prompting of persons in other skills which might be critical, but infrequently used.

The program stored in the microcomputer includes a plurality of successive sequences, each of which involves voice prompts to direct the rescuer to carry out one or more prescribed steps, and then to direct the rescuer to actuate a certain one of the selectors if a particular condition exists when the one or more steps have been carried out. The program then leads into a successive one of the sequences in response to actuation of nonactuation of that one of the selectors.

In a favorable embodiment, the front panel of the device is provided with light-emitting devices (e.g., lamps or LEDs) or LCDs associated with respective ones of the selectors or mode push buttons. The digital processing circuitry includes a drive circuit to activate the respective one of the visual display devices when the sequences of the program direct the rescuer to actuate that particular selector. Also, on the front panel of the housing, printed indicia list the one or more prescribed steps of each sequence that the rescuer is to carry out, and graphically direct the rescuer to the selector to be actuated to bring about the next successive sequences when the predetermined steps of the first sequence have been completed. In a favorable embodiment, there are light-emitting devices associated with each of these indicia which become lit at the appropriate times in accordance with the stored program. Consequently, the rescuer is given both an auditory prompt and a visual prompt for each of the necessary steps of the particular sequences of cardio-pulmonary resuscitation or other skill.

More particularly, in the described embodiment, wherein the program is a CPR training/prompting program for guiding the rescuer through a cardio-pulmonary resuscitation procedure, the various sequences can include a start sequence in which the voice prompts direct the rescuer to initiate ventilation on the victim, check for airway obstruction, and actuate a first one of the selectors if the victim's airway is obstructed; an open-airway sequence in which, if a first selector is actuated, the voice prompts direct the rescuer to clear the victim's airway, to attempt ventillation, and to actuate a second selector; a check-pulse sequence in which, if the second selector has been actuated, the voice prompts direct the rescuer to take the victim's pulse and to actuate a third selector; a rescue-breathing sequence in which, if the third selector has been actuated, the voice prompts direct the rescuer to restore breathing to the victim, to check the victim's pulse, and, if there is no pulse, to actuate a fourth selector; and a chest compression sequence in which, if the fourth selector has been actuated, the voice prompts direct the rescuer to commence chest compressions and breathing on the victim, to check for pulse and breathing, and to actuate a fifth selector if the victim's pulse resumes; and, if the fifth selector is not actuated to repeat the chest compression sequence, the fifth selector being operative to halt the program if actuated.

The foregoing and many other objects, features, and advantages of this invention will become more fully understood from the ensuing detailed description of a preferred embodiment thereof, which description is to be considered in connection with the accompanying drawings, in which:

FIG. 1 is a perspective view showing a CPR training/prompting device according to one embodiment of this invention;

FIG. 2 is a plan view of the front panel of the device of FIG. 1;

FIG. 3, 3A and 3B are schematic circuit diagrams of the embodiment of FIG. 1; and FIG. 4, 4A, 4B and 4C are flow charts for explaining the operation of the embodiment of FIG. 1.

Figure 3A:
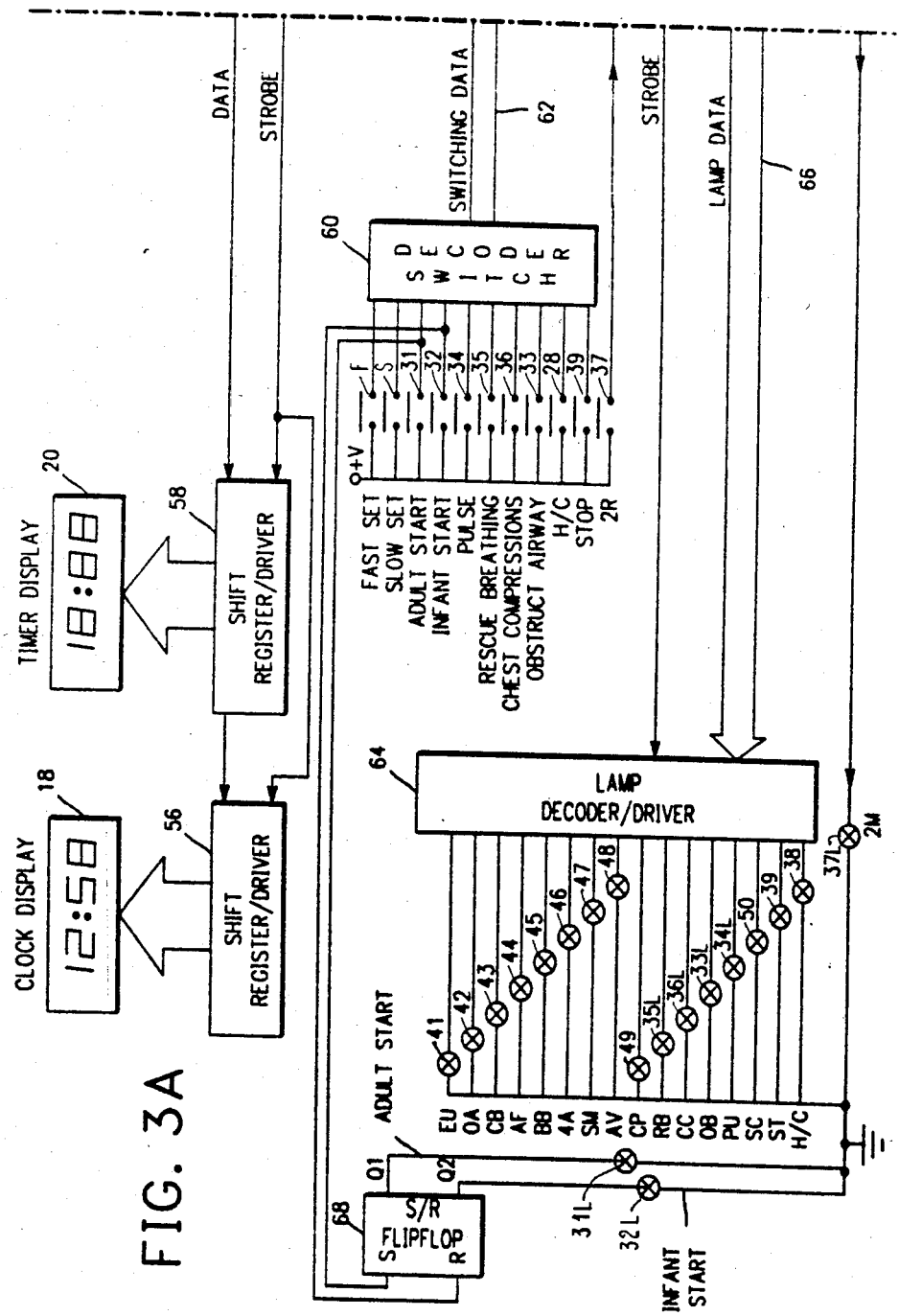

With reference to the drawings, FIG. 1 shows a preferred embodiment of the CPR trainer/prompter device 10 in use in proximity to a victim 12. This victim 12 can be an actual victim of a medical emergency, or can be a volunteer or mannequin. Here, the victim 12 is shown with a carotid pulse sensor 14, which can employ an infrared or another available detector, for sensing the victim's heart beat. This sensor 14 is useful both for detecting whether the victim 12 has a heart beat, or for detecting tachycardia in the victim 12. Here, the sensor 14 clamps gently on the victim's neck, and is coupled by a cord to the CPR trainer/prompter device 10. As shown in FIG. 1, and in greater detail in FIG. 2, a front panel 16 of the device 10 has a clock display 18 and a timer display 20 disposed alongside one another at the upper left-hand corner of the panel 16. Beneath the clock display 18 are a fast-set switch F and a slow-set switch S for setting the time on the clock display 18.

Behind the panel, at the upper right-hand corner thereof, is a speaker 22 through which synthetic speech and other auditory prompts are enunciated.

On a right-hand side panel 23 of the device 10 are a volume control 24, an earphone jack 26, a sensor jack 28 to which the carotid pulse sensor 14 can be connected, and a DC input terminal 30 to which an external power supply (in this case 9 volts) can be connected. Normally, the CPR trainer/prompter device 10 is powered, for example, by six size "AA" alkaline cells. The provision for these cells can be of a conventional design, and is not shown.

Also shown on the front panel 16 of the device 10 are various push-button switches which a trainee or rescuer can actuate to interact with the device 10. These include an Adult Start switch 31, an Infant Start switch 32 disposed alongside the switch 31, an Obstructed airway switch 33, a Pulse switch 34, a Rescue Breathing switch 35, a Chest Compression switch 36, a Two-Rescuer switch 37, a Hold/Continue switch 38, and a Stop switch 39. Each of these switches has a respective lamp or LED embedded in it or beside it and lit at the appropriate time to indicate either that the particular switch button has been actuated or it is to be actuated. In the drawings, the lamp devices are provided with the same reference character as their associated switch, but followed by the letter L. For example, the adult start switch 31 and the infant start switch 32 have lamps 31L and 32L embedded in them. Incidentally, the Infant Start switch 32 is half the size of the remaining switches, thus providing a symbolic reminder that the Infant Start switch 32 is to be actuated when the victim is a small child.

Printed indicia 33I, 34I, 35I, and 36I appear on the front panel 16 and lead to the respective push button switches 33, 34, 35, and 36. These each indicate that the appropriate switch associated therewith is to be activated if the victim's airway is obstructed, if, after the airway has been cleared, ventilation is successful, if a pulse is felt to be present, or, in a rescue breathing mode, if no pulse is felt. Another indicium 37I leads from the Two-Rescuer switch 37 to the chest compression switch 36 to indicate that the push button of the chest compression switch 36 is to be depressed when a two-rescuer mode has been commenced.

Still further, on the front panel 16 of the device 10, a first group of lamps or LEDs includes an Establish Unresponsiveness light 41, an Open Airway light 42, a Check for Breathing light, and an Attempt Breaths light 44, these being arranged vertically near the start switches 31 and 32. There are printed indicia on the front panel 16 associated with each of the lamps 41, 42, 43, and 44, including "ESTABLISH UNRESPONSIVENESS" 41I, "OPEN AIRWAY" 42I, "CHECK FOR BREATHING" 43I, and "ATTEMPT 4 QUICK BREATHS" 44I.

Below the Obstructed Airway push button switch 33 is another group of lamps, including a Four Sharp Back Blows lamp 45, a Four Abdominal Thrusts lamp 46, a Sweep the Mouth Lamp 47, and an Attempt to Ventilate lamp 48. Associated with each of these lamps 45, 46, 47, and 48 is a respective indicium "FOUR SHARP BACK BLOWS" 45I, "FOUR ABDOMINAL THRUSTS (adult)/FOUR CHEST THRUSTS (infant)" 46I, "SWEEP THE MOUTH (adult)/LOOK IN THE MOUTH (infant)" 47I, and "ATTEMPT TO VENTILATE" 48I.

Below the pulse switch 34 is a Check carotid Pulse lamp 49 and an associated indicium 49I; below the chest compression switch 36 is a Start Cardiac Compression lamp 50 and its associate indicium 50I.

Generally, if either the Adult Start switch 31 or the Infant Start switch 32 is actuated, the CPR device 10 commences its stored program. The time on the clock display 18 is held, while its internal timekeeping registers of the device continue updating, and the timer display 20 is zeroed. Thereafter the timer display 20 displays the running time. Then, the lamps 41, 42, 43, and 44 are lit, in sequence. If the victim's airway is obstructed, and the rescuer actuates the Obstructed Airway switch 33, the lamps 45, 46, 47, and 48 are lit in sequence. When the Pulse switch 34 is actuated, the Check carotid Pulse lamp 49 is lit, and when the Chest Compression switch 36 is actuated, the Start Cardiac Compressions lamp 50 is lit. Actuating the Stop switch 39 ends the program and shuts off all the lamps. Thereafter, the time display 20 is turned off and the clock display 18 displays real time. If the Hold/Continue switch 38 is actuated once, the CPR device is set into an idle mode and remains there until the Hold/Continue switch 38 is again actuated or until one of the start switches 31 and 32 is actuated. If the Hold/Continue switch 38 is actuated a second time, the CPR device 10 comes out of its idle mode and the CPR program resumes at the step at which the Hold/Continue switch 38 was first actuated.

Starting the program by depressing either of the switches 31 and 32 places the CPR device 10 in a single-rescuer or "one-man" mode. If the Two-Rescuer switch 37 is depressed anytime during operation of the device 10, the device 10 goes into its two-rescuer or two-man mode. Depressing the switch 37 a second time releases the switch 37 or turns it off, and the device 10 goes back to its one-rescuer mode.

FIG. 3 is a block schematic diagram of the synthetic voice CPR trainer/prompter device 10. This device 10 has at its heart a microcomputer 52. The microcomputer 52 has a read-only memory ROM in which is stored an operating program for actuating the various lamps and providing synthetic-speech phrases corresponding to the protocol for cardio-pulmonary resuscitation. A quartz oscillator 54 provides timing clock or strobe pulses to the microcomputer 52. A first shift register/driver 56 and a second shift register/driver 58 each have inputs connected to the microcomputer 52, and have output busses connected respectively to drive the clock display 18 and the timer display 20. A switch decoder interface circuit 60 has inputs connected to the respective switches F, S, 31, 32, 33, 34, 35, 36, 38, and 39, and has an output coupled through a switch data bus 62 to an input of the microcomputer 52. The Two-Rescuer switch 37 is connected directed to an input of the microcomputer 52.

A lamp decoder/driver 64 has a strobe input coupled to the microcomputer 52 and a data input port coupled to a lamp data bus 66 running from the microcomputer 52. This lamp decoder/driver interface unit 64 has outputs for driving the lamps 41, 42, 43, 44, 45, 46, 47, 48, 49, 50, 38, 39, 33L, 34L, 35L, and 36L. The Adult Start switch 31 and the Infant Start switch 32 are respectively coupled to S and R inputs of an SR flip-flop 68, whose noninverted output $Q_1$ and inverted output $Q_2$ feed current to the Adult Start lamp 31L and the Infant Start lamp 32L. The flip-flop 68 ensures that the appropriate lamp 31L or 32L is lit to indicate the particular mode, that is, the adult mode or the infant mode, which has been selected by the switches 31 and 32. The Two-Rescuer lamp 37L is lit directed by an output of the microcomputer 52.

The microcomputer 52 provides speech address data through a speech address bus 70 to a speech memory unit 72, favorably formed as a programmable read only memory. The speech memory 72, at respective addresses therein, stores the digitized data corresponding to the phrases P1 to P34 listed on the annexed TABLE. The speech data are carried from the speech memory 72 via a speech data bus 74 to a speech synthesizer 76 which in turn provides an analog voice-frequency output signal through a low-pass filter 78 to an audio amplifier 80. The latter has its output connected to the loudspeaker 22 and to the earphone jack 26. As is schematically illustrated in this drawing, the audio amplifier 80 has its gain controlled by the volume control 24, here arranged as a variable resistor.

The speech synthesizer has strobe and reset inputs coupled to outputs of the microcomputer 52, and has a busy output for providing feedback signals to the microcomputer 52.

The CPR trainer/prompter device 10 can be optionally provided with a pulse monitor/tachycardia detector circuit 82 coupled to the microcomputer 52. This detector circuit 82 has an input connected to the sensor jack 28, and provides the microcomputer 52 with indication that the victim has no pulse, the victim has a normal pulse, or that the victim's pulse is racing, indicating fibrillation or tachycardia. The memory ROM in the microcomputer 52 would include an additional routine to alert the rescuer of a tachycardia condition, and the speech memory 72 could include corresponding phrases to instruct the rescuer to deal with the tachycardia condition. For purposes of the discussion to follow, the optional detector circuit 82 has been omitted, but could readily be included in embodiments of this invention.

The operation of the device 10 of this invention can be explained with reference to the flow chart of FIG. 4. In that flow chart, the reference characters P1 to P34, appearing alongside the speaker symbol on the chart, each signify a particular phrase to be enunciated, as listed in the TABLE. The open circles indicate that a particular lamp is to be lit, and the dark circles indicate that a button is to be checked for actuation. A triangle indicates that a delay of the indicated number of seconds is observed.

If either the switch 31 or the switch 32 is actuated, the clock display 18 is frozen, the timer 20 is started, and the Establish Unresponsiveness lamp 41 is lit. The phrases P1 and P2 are enunciated, with appropriate delays following each, after which the open airway lamp 42 is lit. Then, the phrases P4 and P5 are enunciated, with appropriate delays thereafter. If the stop switch 39 has been depressed (decision step [1]), the program stops. However, if the switch 39 has not been actuated, the lamp 44 is actuated, after which the phrases P6, P7, and p8 are enunciated. These are separated by five second intervals, with a three second interval following the phrase P8. Then, if the Obstructed Airway switch 33 has been actuated (decision step [2]), the program goes to an Obstructed Airway routine, otherwise it proceeds to a Rescue Breathing routine.

In the Obstructed Airway routine, the phrase P9 is enunciated, followed by a three-second delay. Then, the phrase P9 is enunciated, followed by a three second delay. Then, the Back Blows lamp 45 is lit, and the phrase P10 is enunciated, followed by a seven-second delay. After that, the Infant Start switch 32 is scanned, and if it has been actuated (decision step [3]), the lamp 46 is lit, the phrase P13 is enunciated, followed by a seven second delay, the lamp 47 is lit, and the phrase P14 is enunciated. If the Infant Start switch 32 has not been actuated, the lamp 46 is lit, the phrase P11 is enunciated followed by a seven-second delay, the lamp 47 is lit, and the phrase P12 is enunciated. After the enunciation of either phrase P12 or P14, a four-second delay is observed, after which the attempt to ventilate lamp 48 is lit. Then, the phrase P15 is enunciated, followed by a three-second delay, and the phrase P16 is enunciated, followed by a three-second delay. After this, the Pulse switch 34 is scanned. If the switch 34 has not been actuated (decision step [4]), the routine iterates, commencing with the lighting of the lamp 45. However, if the Pulse switch 34 has been actuated, or if the Obstructed Airway switch 33 has not been actuated, a check pulse routine is commenced. Here, the lamp 49 is lit, the phrase P17 is enunciated, followed by a seven-second delay, the phrase P18 is enunciated twice, followed by a three-second delay, and then the routine scans to see if the Rescue Breathing switch 35 has been actuated (decision step [5]). If so, the program follows a Rescue Breathing routine. Otherwise, the program proceeds to a CPR routine. The Rescue Breathing routine comprises an Adult routine and an Infant routine. If the Infant Start switch 32 has been actuated (decision step [6]), the Infant routine is followed, otherwise the Adult routine is followed.

In the Infant routine, phrase P19 is enunciated, and then phrases P20 and P21 are enunciated alternately ten times. It is noted that the phrase P20 is a metronome type "tick" sound, and a beep or other timing sound could be substituted, if desired. Thereafter, phrases are enunciated in the order P22, P21, P23, and P21. The phrases P20, P21, P22 and P23 are repeated a number of times, and then the program scans the Chest Compression switch 36 (decision step [7I]). In the Adult rescue breathing routine, phrase P19a is enunciated, followed by six repetitions of phrase P20 followed by phrase P21. Then, phrase P22 is enunciated, followed by phrase P21, phrase P23 followed by phrase P21, ten repetitions of phrase P20 followed by phrase P21, then phrase P22, followed by phrase P21, phrase P23 followed by phrase P21, ten repetitions of phrase P20, followed by phrase P21, then phrase P22, followed by phrase P21, phrase 23 followed by phrase P21, and ten repetitions of phrase P20, followed by phrase P21. Thereafter, the Chest Compression switch 36 is scanned (decision step [7A]). If the switch 36 has not been actuated (step [7A] or [7I]), then the Rescue Breathing routines are iterated. However, if the Chest Compression switch 36 has been actuated, a Chest Compression routine is commenced. If the Rescue Breathing switch 35 has not been actuated (decision step [5]), the program proceeds to a decision step [8] to check whether the obstructed airway switch 33 was the last switch actuated. If not, phrase P9 is enunciated, followed by a five second interval. Otherwise, the Chest Compression routine commences immediately, by lighting the chest compression lamp 36L. Then, the two rescuer switch 37 and the infant start switch 32 are scanned, as indicated by decision steps [9] and [10]. If the two rescuer switch 37 has been actuated, the program proceeds along a Two-Rescuer routine 2R. If not, the Infant Start switch 32 is scanned (step [10]), and if actuated the program proceeds along an infant routine INF, otherwise along a one-rescuer, adult routine AD.

In the Infant routine, phrases P31 and P33 are enunciated. Then, phrases P30, P31, P24 and P33 are enunciated. If the stop switch 39 has not been actuated (decision step [11]), the phrases P30, P31, P24 and P33 are repeated. These four phrases are enunciated repeatedly until the stop switch 39 is actuated.

In the Two-Rescuer routine 2R, phrase P24 is enunciated, followed by phrase P25 and phrase P26. Then, phrase P29 is enunciated twelve times, followed by phrase P30, a three-second delay, and phrase P24. Then, phrase P29 is repeated forty-eight times. After that, the stop switch 39 is scanned (decision step [12]), and if it has not been actuated, phrase P30 is repeated, followed by a three second interval, phrase P24, and forth-eight repetitions of phrase P29.

In Adult routine AD, phrase P24 is enunciated, followed by phrases P25, P26, P27 and P28. The latter is followed by a five second delay, following which phrases P24, P27, P28, and the five second pause are repeated three times. Thereafter, phrase P30 is enunciated, followed by a sevensecond delay. Then, phrase P28 is enunciated, followed by a five-second delay. After that, phrase P24, phrase P27, phrase P28, and a five-second delay are repeated sixteen times. After the last repetition, the routine scans the stop switch 39 (decision step [13]) and if it has not been actuated, the routine reiterates the steps beginning with the enunciation of phrase P30 followed by a seven-second delay, phrase P28, followed by a five second delay, and the sixteen repetitions of phrase P24, phrase P27, and phrase P28.

If the Two-Rescuer switch 37 is actuated after the commencement of the Adult routine AD, a break-routine is followed as generally indicated by the dash lines. That is, phrase P20 is enunciated nine times (i.e., there are nine "ticks") after which the phrase P34 is enunciated ("one quick breath"). Following that, the Two-Rescuer routine 2R commences with phrase P29.

If the victim 12 resumes heart beat and breathing, the Stop switch 39 is actuated by the rescuer, thus halting the program, and the clock display 18 again displays actual time. The Hold/Continue actuator 38 can be used to advantage, for example, during CPR training. This switch 38 halts the program when actuated, and when reactuated begins the program where it left off. Thus, if an instructor wishes, for example, to correct the position of a trainee's hand on the victim's neck or to demonstrate how the four sharp blows are to be administered, the Hold/Continue switch 38 would be actuated. This would give the instructor an opportunity to demonstrate the proper technique. Then, when the instructor has finished, the Hold/Continue switch 38 is again actuated, and the trainee rescuer can reassume his role in a simulated cardio-pulmonary resuscitation.

It should be appreciated that the principles of this invention, that is, the interactive employment of synthetic speech and sequentially operated light displays, can be used to advantage in the training and prompting of many skills in addition to cardio-pulmonary resuscitation. For example, the present invention could be favorably applied to an interactive device for use in flight instruction by a person seeking a private pilot's license, or could, for example, by used by a military reservist to provide prompting and/or instructions for the operation of a tank or other complex weapon system which requires a high degree of skill, but which skill would be used rather infrequently.

It should be appreciated that the invention is not limited to the described embodiment, and that many modifications and variations thereof would present themselves to persons skilled in the art without departure from the scope and spirit of this invention, as defined in the appended claims.

TABLE
STORED VOICE PHRASES

| | |
|---|---|
| P1 | "ESTABLISH UNRESPONSIVENESS" |
| P2 | "IF NO RESPONSE, CALL 'HELP'!" (NOTE: 'HELP" SHOULD BE TWO TO THREE TIMES AS LOUD) |
| P3 | "OPEN AIRWAY" |
| P4 | "CHECK FOR BREATHING" |
| P5 | "IF BREATHING IS PRESENT, PRESS 'STOP' BUTTON: SEEK MEDICAL ATTENTION: OTHERWISE CONTINUE" |
| P6 | "ATTEMPT FOUR QUICK BREATHS; CHEST SHOULD RISE" |
| P7 | "IF THE AIRWAY IS OBSTRUCTED, REPOSITION HEAD AND ATTEMPT TO VENTILATE" |
| P8 | "IF THE AIRWAY IS STILL OBSTRUCTED, PRESS, 'OBSTRUCTED' BUTTON" |
| P9 | "ACTIVATE EMS" |
| P10 | "FOUR SHARP BACK BLOWS" |
| P11 | "FOUR ABDOMINAL THRUSTS" |
| P12 | "SWEEP THE MOUTH" |
| P13 | "FOUR CHEST THRUSTS" |
| P14 | "LOOK IN THE MOUTH" |
| P15 | "ATTEMPT TO VENTILATE" |
| P16 | "IF SUCCESSFUL, GIVE FOUR QUICK BREATHS THEN PRESS 'PULSE' BUTTON" |
| P17 | "CHECK CAROTID PULSE" |
| P18 | "IF PULSE FELT PRESS RESCUE BREATHING BUTTON" |
| P19A | "GIVE ONE BREATH EVERY FIVE SECONDS, BREATHE NOW" |
| P19I | "GIVE ONE BREATH EVERY THREE SECONDS, BREATHE NOW" |
| P20 | "TICK" (NOTE: THIS IS A METRONOME TYPE SOUND WHERE THE "TICKS" ARE SPACED AT ONE SECOND INTERVALS.) |
| P21 | "BREATHE" |
| P22 | "FREQUENTLY CHECK CAROTID PULSE" (NOTE: ENTIRE PHRASE SHOULD TAKE LESS THAN THREE SECONDS) |
| P23 | "IF NO PULSE FELT, PRESS CHEST COMPRESSIONS BUTTON" (NOTE: ENTIRE PHRASE SHOULD TAKE LESS THAN THREE SECONDS) |
| P24 | "LANDMARK" |
| P25 | "ONE AND ONE HALF TO TWO INCH CHEST COMPRESSIONS" |
| P26 | "START CHEST COMPRESSIONS" |
| P27 | "ONE AND TWO AND THREE AND FOUR AND FIVE AND SIX AND SEVEN AND EIGHT AND NINE AND TEN AND ELEVEN AND TWELVE AND THIRTEEN FOURTEEN FIFTEEN" (NOTE: PHRASE SHOULD TAKE TEN SECONDS TO ENUNCIATE.) |
| P28 | "TWO QUICK BREATHS" |
| P29 | "ONE, ONE THOUSAND; TWO, ONE THOUSAND THREE, ONE THOUSAND; FOUR, ONE THOUSAND; FIVE ONE THOUSAND BREATHE" (NOTE: LAST TWO WORDS ARE TO BE ENUNCIATED SIMULTANEOUSLY.) |
| P30 | "STOP CHEST COMPRESSIONS. CHECK PULSE AND BREATHING; IF NECESSARY, CONTINUE C.P.R." |
| P31 | "IF NO PULSE FELT ADMINISTER ONE VENTILATION AND CONTINUE C.P.R." |
| P32 | "NIPPLE LINE, ONE HALF INCH TO ONE INCH CHEST COMPRESSIONS" |
| P33 | "ONE, TWO, THREE, FOUR, FIVE, BLOW" (NOTE: WORDS ARE TO BE ENUCIATED AT A 100 WORD/MINUTE RATE.) |
| P34 | "ONE QUICK BREATH" |

We claim:

1. A hand portable interactive prompter device for prompting a human operative to carry out sequential steps included in different sequences of a technique, said device comprising:

programmed processor means storing representations of each step in each sequence, including pauses separating predetermined successive steps, and programmed to retrieve a particular sequence in response to input signals supplied thereto and to repeat selected sequences in the absence of said input signals;

speech synthesizer means coupled to said processor means for generating audible sounds, including voice prompts, in response to at least some of the representations included in a retrieved sequence, and for producing pauses in response to pause representations; and plural manually operable selector means each being individually operated by said human operative to supply a respective input signal to said processor means for selecting a particular sequence to be retrieved, the particular selector means that is operated being a function of the response of said human operative to said audible sounds and voice prompts;

whereby the human operative carries out the steps in a sequence of said technique as enunciated by said audible sounds and voice prompts, operates a selector means as instructed by the enunciations to initiate another sequence of steps and fails to operate a selector means so as to cause a sequence to be repeated.

2. An interactive method of training and/or prompting a human operative to carry out different sequences of steps of a technique, said method comprising the steps of:

retrieving from storage means a particular sequence of representations of the steps included in that sequence;

synthesizing from at least some of said representations audible sounds, including voice prompts, to instruct said human operative of respective steps in said technique to be performed by said human operative;

providing pauses following at least some of said audible sounds and voice prompts;

generating a signal as a function of the response of said human operative to selected ones of said audible sounds and voice prompts;

using the generated signal to retrieve a sequence of representations of the steps included in a particular sequence; and repeating a sequence of representations in the absence of a generated signal.

3. Portable interactive prompter apparatus for use by a person who has previously been trained in the practice of an established protocol comprised of plural sequences of predetermined physical actions to be performed by the person and including decisions to be made to change or repeat sequences depending upon observations made by the person during the performance of a sequence, said portable interactive prompter apparatus comprising:

first decision selector means operable by the person for starting the operation of said apparatus;

processor control means coupled to said first decision selector means and responsive to the operation of said first decision selector means for controlling said prompter apparatus to initiate a first sequence;

first prompt means controlled by said processor control means for producing a first sequence of prompts corresponding to a first sequence of predetermined physical actions to be performed by the person, said first prompt means producing a pause following each of predetermined prompts of said first sequence, each pause being of sufficient time duration to enable the person to complete the respective physical action called for by the respective preceding prompt before the next-following prompt is produced;

second decision selector means operable by the person separate and apart from the physical actions carried out by said person during the performance of said established protocol and operable as a function of observations made by the person during said first sequence of prompts, said second decision selector means being coupled to said processor control means for supplying a signal indicative of the operation thereof and said processor control means responding to said signal for controlling said prompter apparatus to initiate a second sequence and responding to the absence of said signal for controlling said prompter apparatus to repeat said first sequence; and second prompt means controlled by said processor control means for producing a second sequence of prompts corresponding to a second sequence of predetermined physical actions in response to the operation of said second decision selector means, thereby prompting the person to perform the predetermined physical actions of said second sequence, said second prompt means producing a pause following each of predetermined prompts of said second sequence, each pause being of sufficient time duration to enable the person to complete the respective physical action called for by the respective preceding prompt before the next-following prompt is produced;

whereby said apparatus interacts at each stage in the established protocol with said person by prompting the person as to each physical action to be performed at each stage of each sequence in the protocol, thereby guiding said person in the performance of the protocol.

4. The apparatus of claim 3, wherein said apparatus further comprises light-emitting means or visual display means associated with respective ones of said decision selector means, and said processor control means includes drive means to light the respective one of said light-emitting means or visual display means when said sequences of prompts direct the person to operate a predetermined one of said decision selector means.

5. The apparatus of claim 3, further comprising a housing including a front panel on which said decision selector means are situated, printed indicia on said front panel listing at least some of the physical actions of each sequence to be performed by the person, and means graphically directing the person to the decision selector means to be operated to initiate the next sequence when said physical actions have been completed.

6. The apparatus of claim 5, further comprising light-emitting or visual display means associated with respective ones of said decision selector means and light-emitting or visual display means associated with respective ones of said printed indicia, and said processor control means includes drive means to light the respective one of said light-emitting or visual display means when said sequences of prompts direct the person to operate a predetermined one of said decision selector means, and to light the respective one of said light-emitting or visual display means for the printed indicium associated with the physical action that the sequence of prompts is directing the person to perform.

7. The apparatus of claim 3, further comprising third, fourth, fifth and sixth decision selector means, said protocol is a CPR prompting protocol for guiding a rescuer through a cardio-pulmonary resuscitation procedure for rescuing a victim and said first sequence is a start sequence in which in response to the operation of said first decision selector means, the prompts direct the rescuer to initiate ventilation on the victim, check for airway obstruction, and operate the second decision selector means if the victim's airway is obstructed; an open airway sequence in which, if said second selector means is operated, the prompts direct the rescuer to clear the victim's airway, to attempt ventilation, and to operate the third decision selector means; a check-pulse sequence in which, if the third decision selector means has been actuated, the prompts direct the rescuer to sense the victim's pulse and to operate the fourth decision selector means; a rescue-breathing sequence in which, if said fourth decision selector means has been operated, the prompts direct the rescuer to restore breathing to the victim, to check the victim's pulse, and if there is no pulse to operate the fifth decision selector means; and a chest compression sequence in which, if said fifth decision selector means has been operated, the prompts direct the rescuer to commence chest compressions and breathing for the victim, to check for pulse and breathing, and to operate the sixth decision selector means if said victim's pulse resumes; if said sixth decision selector means is not operated, repeating said chest compression sequence; operation of the sixth decision selector means halting the sequence if operated.

8. The apparatus of claim 7, wherein said chest compression sequence has a one-rescuer mode and a two-rescuer mode, and further comprising an additional decision selector means operable to change over said chest compression sequence to said two-rescuer mode upon operation of said additional decision selector means.

9. The apparatus of claim 7, wherein said chest compression sequence has an adult mode and an infant mode, and further comprising another decision selector means operative to change over said chest compression sequence to said infant mode.

10. The apparatus of claim 7, further comprising a heartbeat pulse sensor, the output of which is supplied to said processor control means to alter the initiated sequence in response to heart pulse changes in a human victim.

11. The apparatus of claim 3, wherein said first and second prompt means comprise synthetic speech generator means including speech memory means having an input coupled to receive speech commands from said processor control means and an output providing speech data, speech synthesizer circuit means receiving said speech data and converting the same to an analog voice-frequency signal, and audio means converting said analog voice-frequency signal to acoustic form as voice prompts.

12. The apparatus of claim 3, wherein said apparatus is contained in a housing to be hand portable, and further comprising a self-contained power supply within said housing.

* * * * *

US004588383C1

(12) EX PARTE REEXAMINATION CERTIFICATE (5243rd)
United States Patent
Parker et al.

(10) Number: US 4,588,383 C1
(45) Certificate Issued: Dec. 13, 2005

(54) INTERACTIVE SYNTHETIC SPEECH CPR TRAINER/PROMPTER AND METHOD OF USE

(75) Inventors: William S. Parker, 2645 Scio Church Rd., Ann Arbor, MI (US) 48103; Harold M. Stillman, Stamford, CT (US)

(73) Assignee: William S. Parker, Ann Arbor, MI (US)

Reexamination Request:
No. 90/007,070, Jun. 9, 2004

Reexamination Certificate for:
Patent No.: 4,588,383
Issued: May 13, 1986
Appl. No.: 06/605,593
Filed: Apr. 30, 1984

(51) Int. Cl.⁷ ............................................. G09B 23/28
(52) U.S. Cl. ........................ 434/265; 434/262; 601/41
(58) Field of Search ........................................ 434/262

(56) References Cited

U.S. PATENT DOCUMENTS

| 3,520,071 A |   | 7/1970  | Abrahamson et al. |         |
|-------------|---|---------|-------------------|---------|
| 3,703,900 A |   | 11/1972 | Holznagel         |         |
| 3,716,059 A |   | 2/1973  | Welborn et al.    |         |
| 4,016,540 A | * | 4/1977  | Hyatt             | 704/258 |
| 4,088,138 A |   | 5/1978  | Diack et al.      |         |
| 4,189,779 A | * | 2/1980  | Brantingham       | 704/265 |
| 4,234,761 A |   | 11/1980 | Wiggins, Jr. et al.|        |
| RE30,750 E  |   | 9/1981  | Diack et al.      |         |
| 4,290,114 A |   | 9/1981  | Sinay             |         |
| 4,302,193 A |   | 11/1981 | Haynes            |         |
| 4,307,728 A |   | 12/1981 | Walton            |         |
| 4,331,426 A |   | 5/1982  | Sweeney           |         |
| 4,360,345 A |   | 11/1982 | Hon               |         |
| 4,401,848 A |   | 8/1983  | Tsunoda           |         |
| 4,408,096 A |   | 10/1983 | Washizuka et al.  |         |
| 4,420,813 A |   | 12/1983 | Inoue et al.      |         |
| 4,435,163 A | * | 3/1984  | Schmitt et al.    | 434/263 |
| 4,464,118 A |   | 8/1984  | Scott et al.      |         |
| 4,481,599 A |   | 11/1984 | Ootsuka           |         |
| 4,493,043 A | * | 1/1985  | Forbath           | 702/178 |
| 4,573,472 A | * | 3/1986  | Ito               | 607/96  |
| 4,583,524 A |   | 4/1986  | Hutchins          |         |
| 4,610,254 A | * | 9/1986  | Morgan et al.     | 607/6   |
| 4,749,353 A | * | 6/1988  | Breedlove         | 434/169 |
| 4,946,391 A | * | 8/1990  | Hawkins et al.    | 434/201 |
| RE34,800 E  |   | 11/1994 | Hutchins          |         |

OTHER PUBLICATIONS

FDA 510(k) Submission for Heart*Aid Model 80 (K820609) approved for marketing Aug. 6, 1982.
FDA 510(k) Submission for Heart*Aid Model 90 (K821152) approved for marketing Aug. 6, 1982.
FDA 510(k) Submission for Heart*Aid ALS Model 95 (K821673) approved for marketing Aug. 6, 1982.
FDA 510(k) Submission for Heart*Aid ALS Model 95 (K841556) approved for marketing Jul. 19, 1984.
FDA 510(k) Submission for Heart*Aid Model 80 (K843358) approved for marketing Nov. 19, 1984.
PortaMedic Audio/Visual CPR Aid.

* cited by examiner

*Primary Examiner*—Xuan M. Thai

(57) ABSTRACT

An interactive trainer/prompter device serves to provide visual and synthetic-speech prompts to a human operative to achieve a task that requires skills that may be critical, but infrequently required. In favorable embodiment, the trainer/prompter device is employed for cardio pulmonary resuscitation. The device has a plurality of actuator push buttons and indicator lamps, and provides synthetic voice prompts. The human operative follows synthetic-speech instructions, and interacts with the device by depressing the appropriate push button, for example, to indicate that a victim is not breathing, or has no detectable pulse.

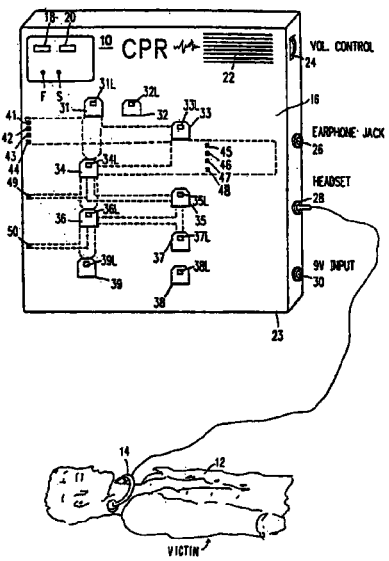

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–12 is confirmed.

* * * * *